(No Model.)
C. I. HAGUE.
FRICTION CLUTCH.
No. 439,504. Patented Oct. 28, 1890.
Fig. 1
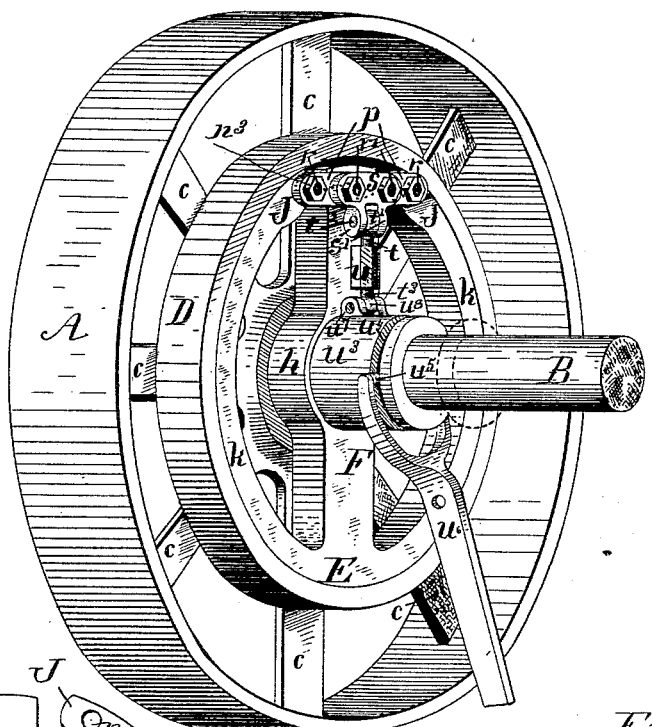
Fig. 2
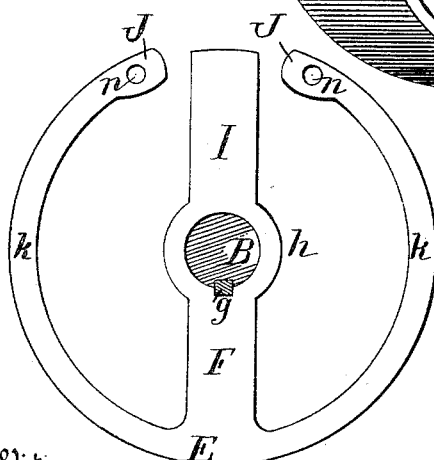
Fig. 3
Fig. 4
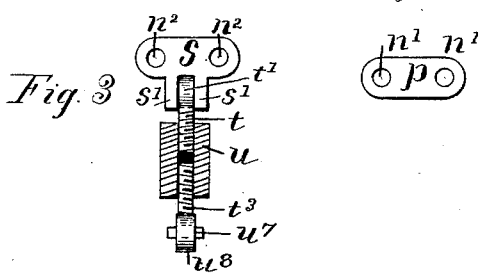
Witnesses
Joseph H. Greenleaf
David L. Clinton
Inventor
Clinton I. Hague
By Attorneys
Geo. H. Barnes

UNITED STATES PATENT OFFICE.

CLINTON I. HAGUE, OF NEW HAVEN, CONNECTICUT.

FRICTION-CLUTCH.

SPECIFICATION forming part of Letters Patent No. 439,504, dated October 28, 1890.

Application filed May 31, 1890. Serial No. 353,719. (No model.)

*To all whom it may concern:*

Be it known that I, CLINTON I. HAGUE, a citizen of the United States, residing at New Haven, in the town and county of New Haven and State of Connecticut, have invented certain new and useful Improvements in Friction-Clutches, of which the following is a specification.

The object of my invention is to provide a friction-clutch of strong, light, simple, and durable construction, which shall be adapted to effect a powerful clutching action by the exertion of a comparatively slight pressure upon the operating-lever, and also admit of ready adjustment; and the invention consists in the novel construction, arrangement, and combination of the parts of the mechanism, as more fully hereinafter described, and particularly pointed out in the claims.

In the accompanying drawings, forming a part of this specification, Figure 1 is a perspective view of my improved friction-clutch, and Fig. 2 is a view of the clutch-ring detached. Figs. 3 and 4 show detached parts of the clutching mechanism.

Referring to the drawings, A designates a pulley, which is mounted loosely upon a shaft B and adapted to revolve freely thereon. Cast integral with the arms C of the pulley and concentric with its axis is a circular rim or flange D, the inner face of which is turned cylindrical and smooth to provide a suitable frictional surface. Within the said rim D is fitted a clutch-ring E, formed integral with a radial arm F, which is rigidly secured upon the shaft B by means of a lengthwise key $g$, fitted in a suitable spline in the shaft and the hub $h$ of the said arm. Opposite to the arm F is a similar radial arm I, which is provided for the purpose of counterbalancing the arm F. The clutch-ring is not continuous, but consists of two opposite segmental portions $k$, which are formed integral with the arm F and extend around concentric with the axis thereof nearly to the opposite arm I, with their ends J a short distance apart.

In each of the ends J of the clutch-ring is a perforation $n$, extending through the ring parallel with the axis thereof, and a toggle-link $p$ is pivoted to each of the said ends by bolts $r$ passing through the said perforation $n$ and a similar perforation $n'$ in the end of the toggle-link. The links at their opposite ends are pivoted by bolts $r'$ to a connecting-link $s$, which has suitable perforations $n^2$ through its ends, and all the bolts which thus connect the said links and the clutch-ring are secured by suitable nuts $n^3$.

On the inner side of the connecting-link $s$ are two perforated ears $s'$, between which a threaded rod $t$, having an eye $t'$, is hinged by means of a pivot $t^2$ passed through the said ears and the perforated eye of the rod. The rod is screwed into an adjusting-nut $u$, and a similar rod $t^3$, having its thread reverse-handed to that of the rod $t$, is screwed into the nut from the opposite end thereof, the nut being formed with a right-hand thread half-way of its length and having a left-hand thread over the other half length thereof to conform to the corresponding threads of the said rods.

The rod $t^3$ is pivoted to a sliding collar or movable sleeve $u^3$, which is adapted to be moved lengthwise on the shaft, and has a circumferential groove $u^4$ for receiving the prongs $u^5$ of an ordinary forked clutch-lever $u^6$, which may be fulcrumed upon any suitable stationary object in the usual and well-known manner of arranging and operating clutch-handles. The said sleeve is provided with suitable ears $u^7$, through which and the eye $u^8$ of the rod $t^3$ a pivot-pin is arranged, thus connecting the said sleeve with the toggle mechanism.

It will be seen that the toggle-links $p$ and the connecting-link $s$ form a powerful "toggle-joint" adapted as they are brought into alignment to separate the ends of the clutch-ring and force the segmental portions $k$ thereof against the surface of the rim D with great pressure, the said parts $k$ being sufficiently thin and elastic to yield and swing outward to a certain extent and conform nicely to the inner circular face of the said rim to produce friction thereon. The rods $t\ t^3$ and the adjusting-nut $u$ together form a toggle-link, which, acting between the connecting-link $s$ and the movable sleeve $u^3$, is adapted as it is brought into a radial position to force the links $p$ of the said toggle-joint into line, and thus multiply the wedging effect on the clutch-ring. The parts are so proportioned and arranged that when the sleeve $u^3$ is in juxtaposition to the hub $h$ of the clutch-ring the rods $t\ t^3$ and adjusting-nut $u$ are all substantially in a radial line, and the centers of the toggle-links and connecting-link are all nearly in a line at right angles to the said radial line, and the clutch-ring is then pressed tightly against the inner face of the rim D of the pulley, in which position the toggles will exert their greatest wedging action and remain securely placed. Then in operation as the pulley revolves the clutch-ring E will be carried around with and driven by it, thus rotating the shaft with the pulley. To release the shaft from being driven with the pulley, the sleeve $u^3$ may be moved along the shaft away from the hub $h$ to the position shown by the dotted lines in Fig. 1, which movement will draw the connecting-link $s$ and corresponding ends of the toggle-links $p$ inward, and thus close the ends of the clutch-ring together and free the segmental portions $k$ thereof from contact with the rim D, so that the shaft and pulley will be independent of each other. Pushing the sliding collar up toward the pulley will expand the clutch-ring and clutch the parts together.

It will be seen that the clutch-ring E, cast integral with the driving-arm F at a point midway of its annular length or opposite to its free ends, constitutes a pair of elastic segmental levers K, which, being fixed and practically fulcrumed at one end to the arm F and adapted to spring and swing as if hinged at those points, are thus forced against the rim D with a pressure that greatly exceeds the direct pressure of the toggles, and, being elastic, are adapted to conform readily to the circle of the rim, thus insuring intimate frictional contact therewith. The leverage thus obtained by the construction of the ring and the combination of the toggle-levers insures a very powerful clutching and driving effect, the production of which requires but slight initial pressure on the clutch-handle.

The construction of the clutch-ring, as formed integral with a driving-arm, affords simplicity, and the toggle mechanism being also simple the clutch is inexpensive, durable, and free from liability to disarrangement. The pressure upon the clutching parts may be easily regulated by means of the adjusting-nut $u$. If desired, the rim D may be dispensed with and the clutch-ring fitted into the pulley-rim instead.

I claim—

1. In a friction-clutch, the combination of a shaft, a wheel or pulley fitted loosely thereon and provided with a circular flange, an arm secured upon the shaft adjacent to the pulley, an annular segment integrally attached to the arm to provide opposite elastic friction-segments adapted to fit within the said circular flange, toggle-links pivoted to the free ends of the said friction-segments, a connecting-link pivotally connected to the said toggle-links, a radial toggle-link hinged to the connecting-link and built up of screw-threaded and connected portions adapted to adjust the lengths of the said link or space between the hinge-joints or centers thereof, and a sleeve or collar fitted and adapted to move lengthwise upon the shaft and hinged to the said radial link, whereby as the collar is moved upon the shaft the toggle-links are operated to expand and clutch the segments in the pulley-flange or to release them therefrom, for the purpose specified.

2. The combination of a shaft, the pulley thereon having a circular flange, an arm secured on the shaft, an annular clutch-segment formed integral with the arm midway of its circumference to provide opposite elastic lever-segments extending from the arm, the toggle-links hinged to the ends of said lever-segments, a connecting-link connecting the said toggles, the radial rod hinged to the connecting-link, a sleeve movable lengthwise on the shaft, a rod hinged thereto, an adjusting-nut connecting the said rods, and a clutch handle or lever for operating the said sleeve, all arranged substantially in the manner and for the purpose specified.

CLINTON I. HAGUE.

Witnesses:
W. ALBERT HAWKES,
CHAS. B. SHUMWAY.